United States Patent
Richter et al.

(10) Patent No.: US 9,786,310 B1
(45) Date of Patent: Oct. 10, 2017

(54) DATA STORAGE DEVICE DETECTING LASING THRESHOLD OF LASER BY MEASURING PROTRUSION EFFECT

(71) Applicant: Western Digital Technologies, Inc., San Jose, CA (US)

(72) Inventors: Hans J. Richter, Palo Alto, CA (US); Robert E. Eaton, San Jose, CA (US); Andreas Moser, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/615,050

(22) Filed: Jun. 6, 2017

(51) Int. Cl.
  *G11B 5/60* (2006.01)
  *G11B 21/12* (2006.01)

(52) U.S. Cl.
  CPC .......... *G11B 5/6011* (2013.01); *G11B 5/607* (2013.01); *G11B 5/6052* (2013.01); *G11B 5/6088* (2013.01); *G11B 21/12* (2013.01)

(58) Field of Classification Search
  CPC ........................................ G11B 5/60–5/6088
  USPC .............................................. 360/55, 69, 75
  See application file for complete search history.

(56) References Cited

U.S. PATENT DOCUMENTS

| | | | | |
|---|---|---|---|---|
| 6,307,817 B1* | 10/2001 | Tsuboi | ............... | G01R 33/1207 369/13.17 |
| 7,515,372 B2* | 4/2009 | Erden | ................... | G11B 5/6005 360/75 |
| 8,149,652 B2* | 4/2012 | Erden | ................... | G11B 5/6005 360/59 |
| 8,279,550 B1 | 10/2012 | Hogg | | |
| 8,477,569 B2* | 7/2013 | Erden | ................... | G11B 5/6088 369/13.01 |
| 8,665,547 B1 | 3/2014 | Yeo et al. | | |
| 8,724,249 B2 | 5/2014 | Contreras | | |
| 8,787,125 B1* | 7/2014 | Lee | ........................ | G11B 5/607 369/13.26 |
| 8,824,249 B2* | 9/2014 | Erden | .................. | G11B 5/6088 369/13.26 |
| 8,902,718 B1* | 12/2014 | Ruan | ...................... | G11B 5/607 369/13.11 |
| 8,922,929 B1 | 12/2014 | Ruan et al. | | |
| 8,976,633 B1* | 3/2015 | Ruan | ...................... | G11B 5/607 360/55 |
| 9,117,479 B1* | 8/2015 | Madison | ................ | G11B 5/455 |
| 9,123,370 B1* | 9/2015 | Ruan | .................. | G11B 5/607 |
| 9,153,266 B1* | 10/2015 | Chia | ...................... | G11B 5/607 |
| 9,153,272 B1* | 10/2015 | Rausch | ................ | G11B 5/6088 |
| 9,153,276 B2* | 10/2015 | Johnson | ................. | G11B 5/607 |
| 9,163,939 B2* | 10/2015 | Takayama | ............ | G01B 11/272 |
| 9,230,586 B1* | 1/2016 | Ota | ........................ | G11B 5/6011 |
| 9,236,081 B1* | 1/2016 | Chu | ................. | G11B 11/10595 |

(Continued)

OTHER PUBLICATIONS

ILX Lightwave, "The Differences Between Threshold Current Calculation Methods," Jun. 1, 2003, Application Note #12, http://assets.newport.com/webDocuments-EN/images/AN12_Threshold_Current_Calc_IX.PDF.

*Primary Examiner* — Wayne Young
*Assistant Examiner* — James L Habermehl

(57) ABSTRACT

A data storage device is disclosed comprising a head actuated over a disk, wherein the head comprises a laser configured to heat the disk while writing data to the disk. At least four different laser powers are applied to the laser and a fly height of the head over the disk is measured at each laser power. A lasing threshold power for the laser is detected based on the measured fly heights.

18 Claims, 5 Drawing Sheets

(56) References Cited

U.S. PATENT DOCUMENTS

| | | | |
|---|---|---|---|
| 9,311,943 B2* | 4/2016 | Canchi | |
| 9,311,951 B1* | 4/2016 | Chu | G11B 5/02 |
| 9,454,986 B2* | 9/2016 | Johnson | G11B 5/607 |
| 9,536,559 B1* | 1/2017 | Cordle | G11B 7/1263 |
| 9,589,587 B1* | 3/2017 | Chu | G11B 5/02 |
| 9,595,277 B2* | 3/2017 | Lou | G11B 5/607 |
| 9,620,162 B1* | 4/2017 | Haralson | G11B 7/1263 |
| 2009/0296256 A1* | 12/2009 | Tsuyama | G11B 5/02 360/59 |
| 2016/0343395 A1* | 11/2016 | Rausch | G11B 5/607 |

* cited by examiner

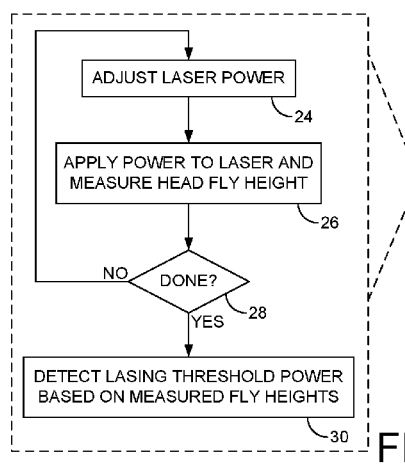
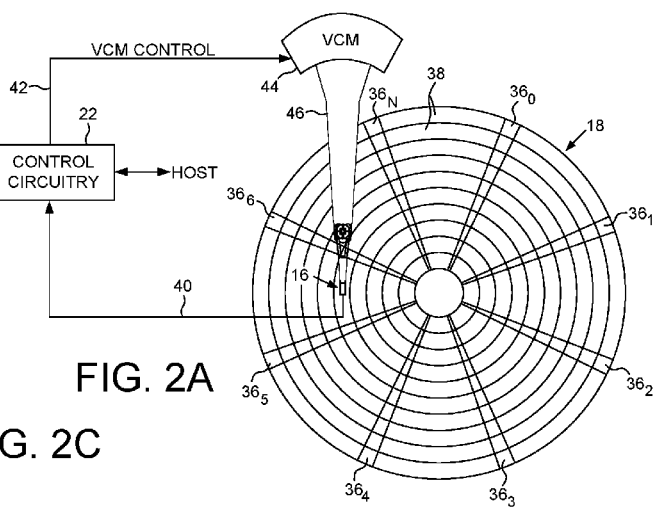
FIG. 2A
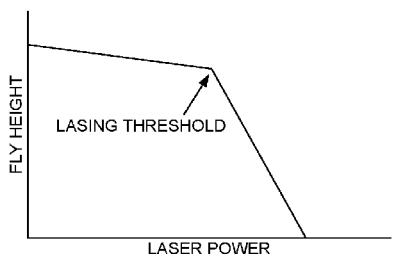
FIG. 2C
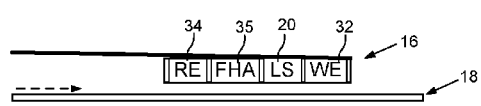
FIG. 2B
FIG. 2D

DATA STORAGE DEVICE DETECTING LASING THRESHOLD OF LASER BY MEASURING PROTRUSION EFFECT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive comprising a head actuated over a disk, wherein the head comprises a laser configured to heat the disk while writing data to the disk.

FIG. 2C is a flow diagram according to an embodiment wherein a fly height of the head over the disk is measured at multiple laser powers, and a lasing threshold power is detected based on the fly height measurements.

FIG. 2D shows a graph according an embodiment of the fly height measurements relative the laser power, including the detected lasing threshold power.

DETAILED DESCRIPTION

Figure 1:
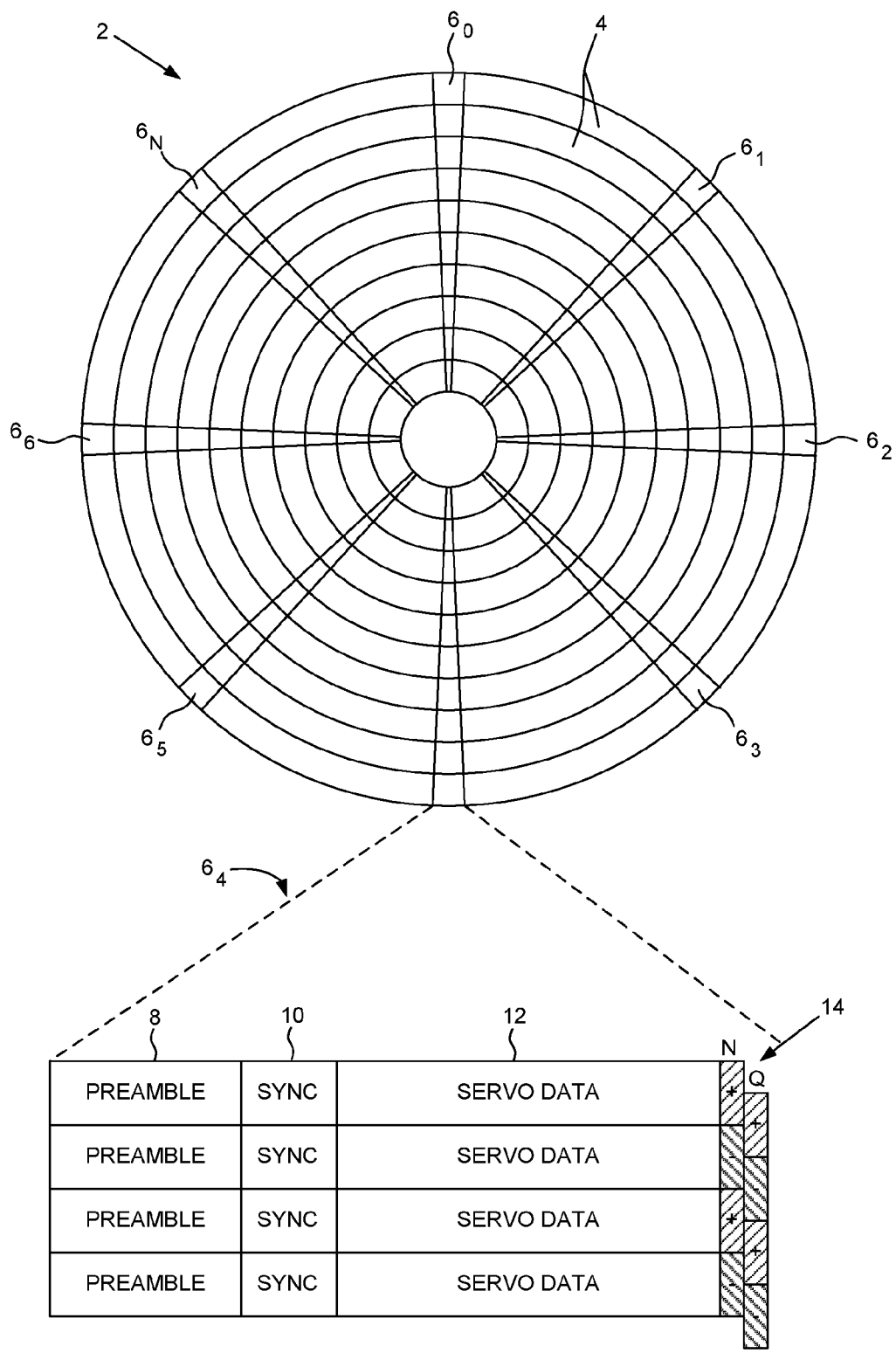
FIG. 1 shows a prior art disk format comprising a plurality of servo tracks defined by servo sectors.

FIGS. 2A and 2B show a data storage device in the form of a disk drive according to an embodiment comprising a head 16 actuated over the disk 18, wherein the head comprises a laser 20 (FIG. 2B) configured to heat the disk while writing data to the disk. The disk drive further comprises control circuitry 22 configured to execute the flow diagram of FIG. 2C, wherein a laser power is adjusted (block 24), and while applying the laser power to the laser a fly height of the head is measured (block 26). After taking at least four fly height measurements at different laser powers (block 28), a lasing threshold power of the laser is detected based on the measured fly heights (block 30). FIG. 2D is a graph according to an embodiment of the fly height measurements relative the laser power, including the detected lasing threshold power.

In the embodiment of FIG. 2B, the head 16 comprises a suitable write element 32 (e.g., an inductive coil), a suitable read element 34 (e.g., a magnetoresistive element), and a suitable fly height actuator (FHA) 35 configured to actuate the head 16 vertically over the disk 18. Any suitable FHA 35 may be employed, such as a heater that actuates through thermal expansion, or a piezoelectric actuator that actuates through mechanical deflection. The head 16 may comprise any suitable laser 20 for heating the disk 18, such as a laser diode, as well as any suitable optics for focusing the light emitted by the laser 20 onto the disk, such as a waveguide and a near field transducer (NFT).

In the embodiment of FIG. 2A, the disk 18 comprises a plurality of servo sectors $36_0$-$36_N$ that define a plurality of servo tracks 38, wherein data tracks are defined relative to the servo tracks at the same or different radial density. The control circuitry 22 processes a read signal 40 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 42 applied to a voice coil motor (VCM) 44 which rotates an actuator arm 46 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the laser 20 may exhibit a lasing threshold power which is the power applied to the laser that causes it to begin lasing. In one embodiment, the write power applied to the laser during write operations may be determined based on the lasing threshold power, such as by adding an offset to the lasing threshold power. Other laser power modes may also be determined based on the lasing threshold power, such as the non-write power applied to the laser while the head passes over the servo sectors so as not to corrupt the servo data recorded in the servo sectors. Conventionally, the lasing threshold power has been detected by integrating a photodiode into the head that measures the output power of the laser, for example, by measuring an amount of backlight generated by the laser. However, integrating a photodiode into the head increases the manufacturing cost and complexity of the head.

In one embodiment, the cost and complexity of a photodiode is avoided by detecting the lasing threshold power of the laser based on a plurality of fly height measurements taken at different laser powers. As the laser power is increased, a heating effect causes components of the head to protrude toward the disk surface, thereby decreasing the fly height of the head over the disk. When the power reaches the lasing threshold, the heating effect increases significantly causing a sharper decrease in the fly height of the head. Accordingly, by measuring the fly height of the head at different laser powers the lasing threshold power may be detected without the use of a photodiode.

Figure 3A:
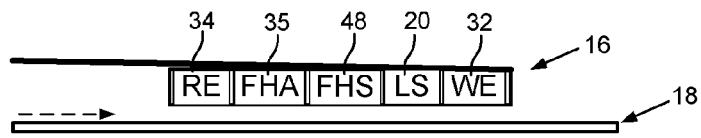
FIG. 3A shows an embodiment wherein the head further comprises a fly height sensor.
Figure 3B:
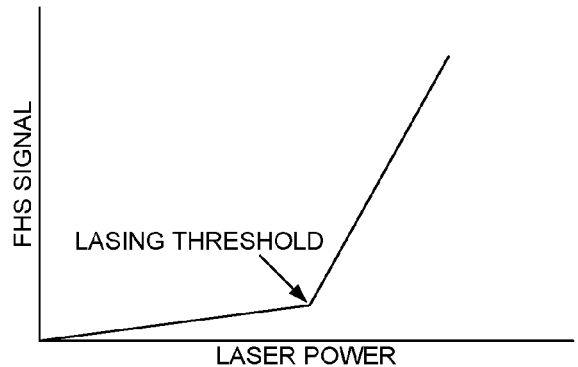
FIG. 3B shows a graph according to an embodiment wherein the fly height measurements are based on a sensor signal generated by the head's fly height sensor.

The fly height of the head over the disk may be measured in any suitable manner. FIG. 3A shows an embodiment wherein the head 16 comprises a suitable fly height sensor (FHS) 48, such as a suitable thermistor (e.g., a magnetoresistive element) having a thermal coefficient of resistance. In this embodiment, the resistance of the thermistor varies with the fly height of the head due, for example, to the disk acting as a heat sink as the head approaches the disk surface. A suitable FHS signal may be generated by applying a reference voltage across the thermistor and measuring the change in current corresponding to the change in resistance. FIG. 3B shows a graph of a FHS signal (e.g., current flowing through a thermistor) relative to the laser power, including the detected lasing threshold power.

Figure 4:
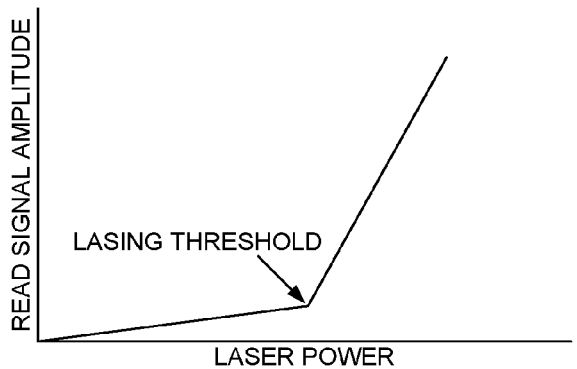
FIG. 4 shows a graph according to an embodiment wherein the fly height measurements are based on an amplitude of a read signal generated by the head.

Another technique for measuring the fly height of the head is to write test data to the disk, and then while reading the test data, measure an amplitude of the read signal. As the fly height of the head decreases, there is a corresponding increase in the read signal amplitude. In one embodiment, the read signal amplitude may be determined by a control signal applied to a variable gain amplifier (VGA) in a gain control loop that attempts to maintain the output of the VGA at a target level. FIG. 4 shows a graph of the read signal amplitude relative to the laser power, including the detected lasing threshold power.

Figure 5:
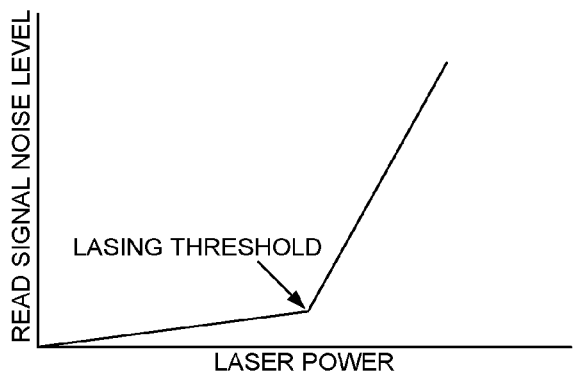
FIG. 5 shows a graph according to an embodiment wherein the fly height measurements are based on a noise level of a read signal generated by the head.

In another embodiment, the fly height of the head may be measured by evaluating a noise level in the read signal while the head is positioned over an unwritten or erased track on the disk. As the fly height of the head decreases, there is a corresponding increase in the read signal noise level. FIG. 5 shows a graph of the read signal noise level relative to the laser power, including the detected lasing threshold power.

Figure 6:
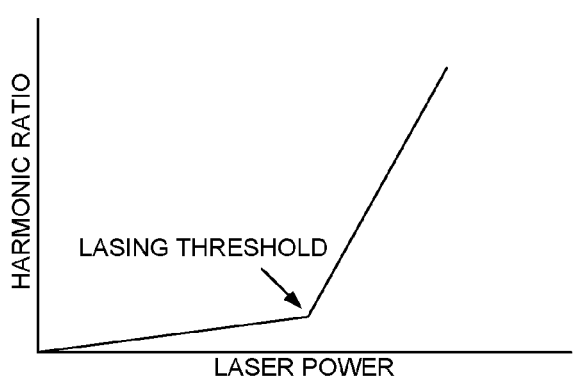
FIG. 6 shows a graph according to an embodiment wherein the fly height measurements are based on a harmonic ratio measurement of the read signal.

Another known technique for measuring the fly height of the head is a harmonic ratio technique (Wallace spacing equation) that measures a head-media spacing (HMS) based on a ratio of the amplitude of the read signal at two different harmonics while reading a periodic pattern from the disk. In one embodiment, the harmonic ratio can be generated by reading a periodic pattern at two different frequencies (e.g., a 2T and 6T pattern) and therefore may be referred to as an HMS 2T/6T technique. FIG. 6 shows a graph of the harmonic ratio measurement relative to the laser power, including the detected lasing threshold power.

Figure 7:
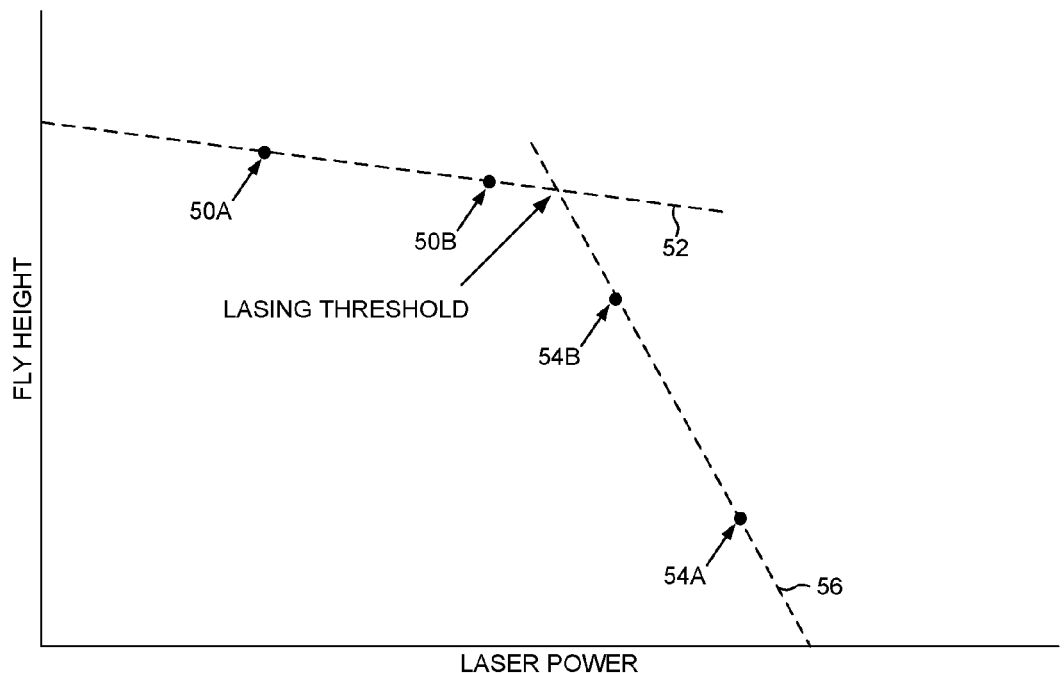
FIG. 7 shows an embodiment wherein the lasing threshold is detected based on the fly height measurements taken for four different laser powers.

FIG. 7 shows an embodiment for detecting the lasing threshold power of the laser by taking two fly height measurements 50A and 50B at two laser powers that are below the lasing threshold. These two fly height measurements are then curve fitted to a first line 52 representing a linear relationship between the fly height and laser power before the lasing threshold. Two fly height measurements 54A and 54B are taken at two laser powers that are above the lasing threshold. These two fly height measurements are then curve fitted to a second line 56 representing a linear relationship between the fly height and laser power after the lasing threshold. In this embedment, the intersection of the first line 52 and the second line 56 represents the estimated lasing threshold power for the laser. In one embodiment, more fly height measurements may be taken at different laser powers before and after the lasing threshold in order to increase the accuracy of the linear relationships.

Figure 8:
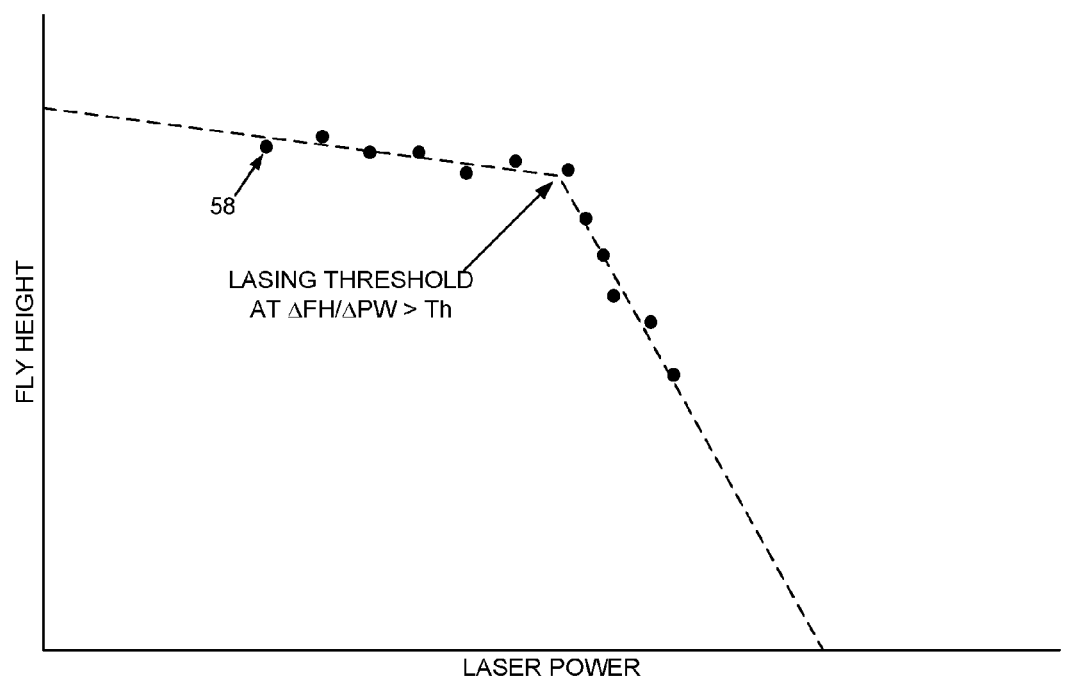
FIG. 8 shows an embodiment wherein the lasing threshold is detected when the slope of the fly height measurements exceeds a threshold.

FIG. 8 shows an embodiment wherein the laser power is initialized to a low level below the lasing threshold level and a corresponding fly height measurement 58 taken. The laser power is then increased incrementally with additional fly height measurements taken at each laser power. The fly height measurements are curve fitted to a graph, and a slope of the graph is estimated based on the curve fitted measurements in order to detect the lasing threshold power. For example, in one embodiment the lasing threshold power may be detected when the slope of the graph exceeds a threshold, when a second derivative of the graph reaches a maximum, etc.

Figure 9:
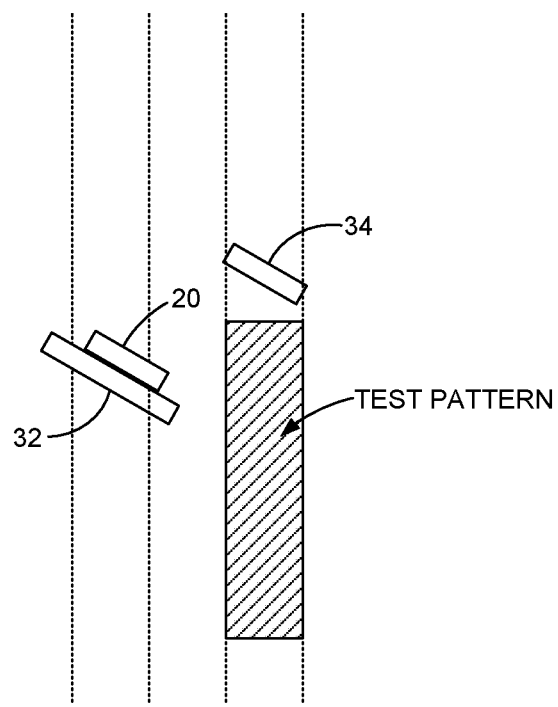
FIG. 9 shows an embodiment wherein the head is positioned at a skew angle such that the write element is over a first track and the read element is over a second track in order to read a test pattern at different laser power levels.

FIG. 9 shows an embodiment wherein the fly height of the head may be measured by using the read element 34 to read test data from a data track, for example, by measuring the amplitude of the read signal, or by computing a harmonic ratio measurement (Wallace spacing equation) by processing the read signal. In this embodiment, the control circuitry 22 positions the head 16 at a target radial location of the disk (e.g., the outer diameter) so as to skew the angle of the head relative to the tracks. In this manner, the read element 34 may be positioned over the track with the test data, whereas the write element 32 and laser 20 may be positioned over a different track so that the heating effect of the laser 20 does not corrupt the test data while taking the fly height measurements at different laser powers.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a laser configured to heat the disk while writing data to the disk; and
   control circuitry configured to:
      apply at least four different laser powers to the laser and measure a fly height of the head over the disk at each laser power; and
      detect a lasing threshold power for the laser based on the measured fly heights.

2. The data storage device as recited in claim 1, wherein:
   the head further comprises a fly height sensor; and
   the control circuitry is further configured to measure the fly height of the head over the disk based on the fly height sensor.

3. The data storage device as recited in claim 1, wherein:
   the head further comprises a write element and a read element; and
   the control circuitry is further configured to measure the fly height of the head over the disk based on a read signal emanating from the read element.

4. The data storage device as recited in claim 3, wherein the control circuitry is further configured to measure the fly height of the head over the disk based on an amplitude of the read signal.

5. The data storage device as recited in claim 3, wherein the control circuitry is further configured to measure the fly height of the head over the disk based on a noise level of the read signal.

6. The data storage device as recited in claim 3, wherein the control circuitry is further configured to measure the fly height of the head over the disk based on a harmonic ratio of the read signal.

7. The data storage device as recited in claim 3, wherein:
   the disk comprises a plurality of data tracks; and
   when measuring the fly height of the head over the disk the control circuitry is further configured to position the write element over a first data track and the read element over a second data track.

8. The data storage device as recited in claim 1, wherein the control circuitry is further configured to detect the lasing threshold power of the laser by curve fitting the fly height measurements.

9. The data storage device as recited in claim 1, wherein the control circuitry is further configured to detect the lasing threshold power of the laser by detecting when a derivative of the fly height measurements exceeds a threshold.

10. A method of operating a data storage device, the method comprising:
    applying at least four different laser powers to a laser of a head and measuring a fly height of the head over a disk at each laser power; and
    detecting a lasing threshold power for the laser based on the measured fly heights.

11. The method as recited in claim 10, wherein:
    the head further comprises a fly height sensor; and
    measuring the fly height of the head over the disk is based on the fly height sensor.

12. The method as recited in claim 10, wherein measuring the fly height of the head over the disk is based on a read signal emanating from a read element of the head.

13. The method as recited in claim 12, further comprising measuring an amplitude of the read signal, wherein measuring the fly height of the head over the disk is based on the amplitude of the read signal.

14. The method as recited in claim 12, further comprising measuring a noise level of the read signal, wherein measuring the fly height of the head over the disk is based on the noise level of the read signal.

15. The method as recited in claim 12, further comprising measuring a harmonic ratio of the read signal, wherein measuring the fly height of the head over the disk is based on the harmonic ratio of the read signal.

16. The method as recited in claim 12, further comprising positioning the head over the disk to position a write element of the head over a first data track and a read element of the head over a second data track when measuring the fly height of the head over the disk.

17. The method as recited in claim 10, further comprising detecting the lasing threshold power of the laser by curve fitting the fly height measurements.

18. The method as recited in claim 10, further comprising detecting the lasing threshold power of the laser by detecting when a derivative of the fly height measurements exceeds a threshold.

* * * * *